(12) United States Patent
Tseng et al.

(10) Patent No.: US 7,277,739 B2
(45) Date of Patent: Oct. 2, 2007

(54) COMMUNICATION DEVICE

(75) Inventors: Steven Tseng, Taipei (TW); An-Ping Yang, Shanghai (CN)

(73) Assignee: Inventec Appliances Corporation, Taipei Hsieng (TW)

( * ) Notice: Subject to any disclaimer, the term of this patent is extended or adjusted under 35 U.S.C. 154(b) by 128 days.

(21) Appl. No.: 10/988,525

(22) Filed: Nov. 16, 2004

(65) Prior Publication Data
US 2006/0105823 A1 May 18, 2006

(51) Int. Cl.
*H04M 1/00* (2006.01)
(52) U.S. Cl. .............. 455/575.7; 455/575.1; 455/90.3; 343/702; 343/703
(58) Field of Classification Search ............ 455/575.7, 455/575.1, 90.3, 90.2; 343/702, 720; 342/702, 342/703
See application file for complete search history.

(56) References Cited

U.S. PATENT DOCUMENTS 5,030,964 A * 7/1991 Nakanishi ................... 343/715
5,436,633 A * 7/1995 Liu ............................. 343/723
5,950,116 A * 9/1999 Baro ......................... 455/575.7
6,269,240 B1 * 7/2001 Chong et al. ................. 455/73
6,501,417 B1 * 12/2002 Bowlds ....................... 342/104
6,927,744 B2 * 8/2005 Saito et al. .................. 343/895
6,927,774 B2 * 8/2005 Yano ........................... 345/469
6,940,472 B2 * 9/2005 Peng ........................... 343/906
6,975,273 B1 * 12/2005 Choi ........................... 343/702

FOREIGN PATENT DOCUMENTS

JP       02004336155 A    * 11/2004

* cited by examiner

*Primary Examiner*—Danh Le
(74) *Attorney, Agent, or Firm*—Birch, Stewart, Kolasch & Birch, LLP

(57) ABSTRACT

A communication device. The communication device comprises a body, a circuit board, an antenna unit and a cap. The body is host receiving the circuit board therein, and the antenna unit electronically connected to the circuit board is located at one side of the body for receiving and transmitting signals. The cap is a replaceable element externally mounted on the antenna unit.

20 Claims, 6 Drawing Sheets

COMMUNICATION DEVICE

BACKGROUND

The present invention relates to a communication device, and in particular to a communication device providing a replaceable cap on an antenna unit.

Referring to FIG. 1, a mobile phone P1 has a host M1 and a removable antenna M2 disposed thereon. The antenna M2 is rotatably connected to the host M1. The antenna M2 comprises a coil module and an antenna housing (not shown). In a typical manufacturing process, the coil module and the antenna housing are integrally assembled. If the antenna M2 has to be replaced by a new one, the coil module and the antenna housing must be replaced together. Thus, cost for these elements increases even if one of them is still functional.

Typically, a layer of Poly Propylene Oxide (PPO) material is coated on the outside of the antenna. An antenna coated with PPO material, however, cannot be coated with additional substances. That is to say, only the color of PPO material itself can be presented on the antenna.

In FIG. 2, a mobile phone P2 has a host N1 and an antenna N2 disposed thereon. The antenna N2 has a pair of hooks K connecting to a base (not shown) enclosed by the host N1. Once the mobile phone P2 is assembled, the antenna N2 hooked on the base of the host N1 cannot be removed from the exterior of the mobile phone P2, i.e., the antenna N2 can be replaced by disassembling the host N1.

SUMMARY

The communication device comprises a body, a circuit board, an antenna unit and a cap. The body is a host receiving the circuit board therein, and the antenna unit electronically connected to the circuit board is located at one side of the body for receiving and transmitting signals. The cap is a replaceable element externally mounted on the antenna unit.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will became apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION

Figure 1:
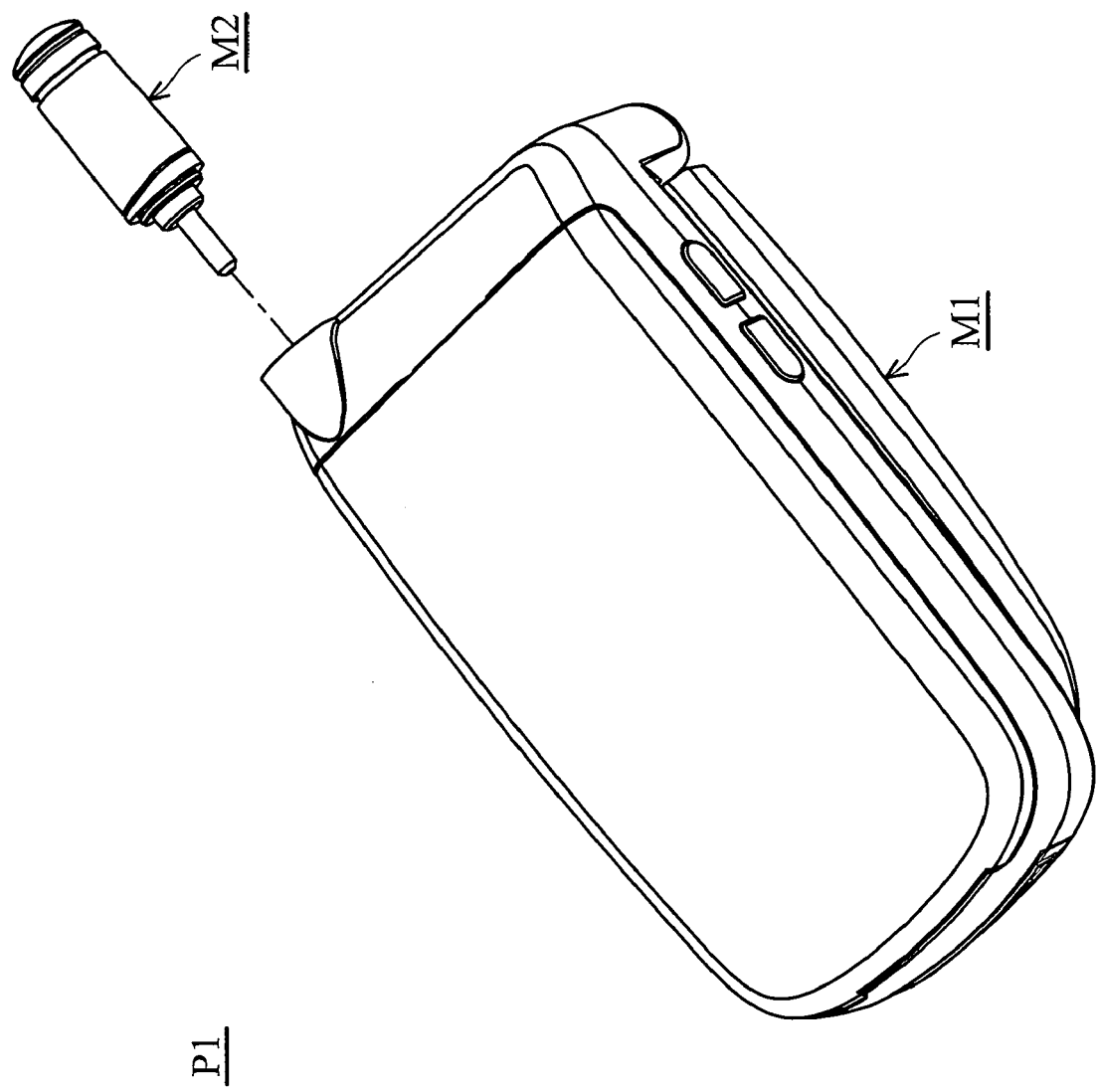
FIG. 1 is a perspective view of a conventional mobile phone (P1)
Figure 2:
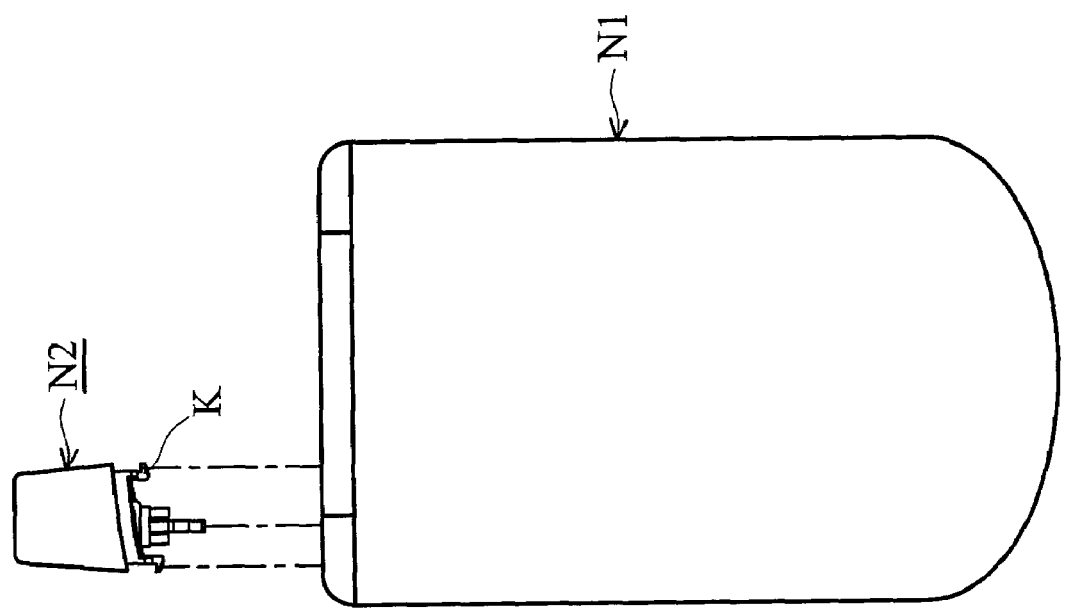
FIG. 2 is a perspective view of another conventional mobile phone (P2)
Figure 3:
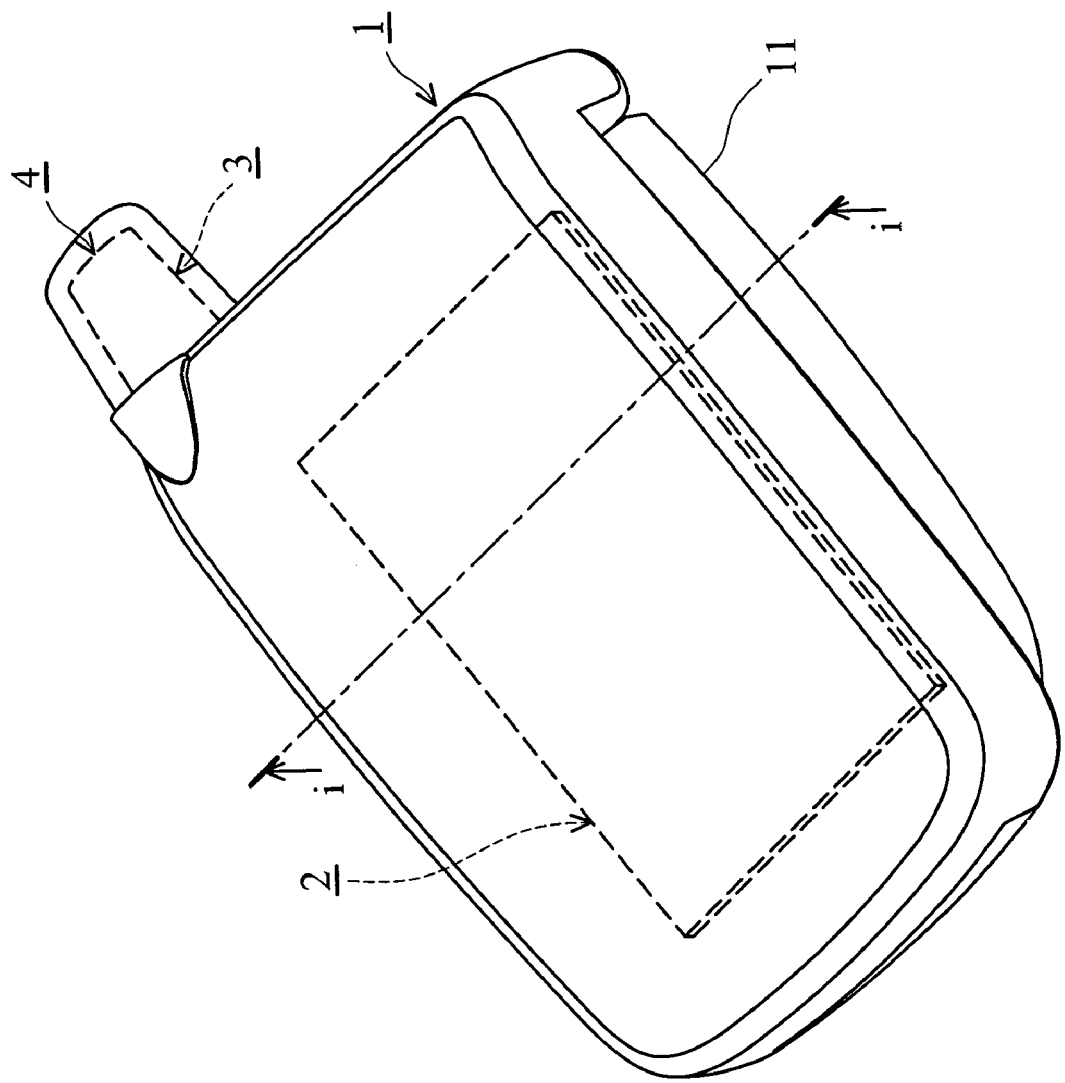
FIG. 3 is a perspective view of a communication device (E) of an embodiment of the invention, wherein the communication device (E) comprises a body (1), a circuit board (2), an antenna unit (3) and a cap (4)

FIG. 3 is a perspective view of a communication device E of an embodiment of the invention. The communication device E is an electronic device such as mobile phone and Personal Digital Assistant (PDA).

The communication device E comprises a body 1, a circuit board 2, an antenna unit 3 and a cap 4. The body 1 is a host receiving the circuit board 2 therein, and the antenna unit 3 electronically connected to the circuit board 2 is located at one side of the body 1 for receiving and transmitting signals. The cap 4 is a replaceable element externally mounted on the antenna unit 3.

Figure 4B:
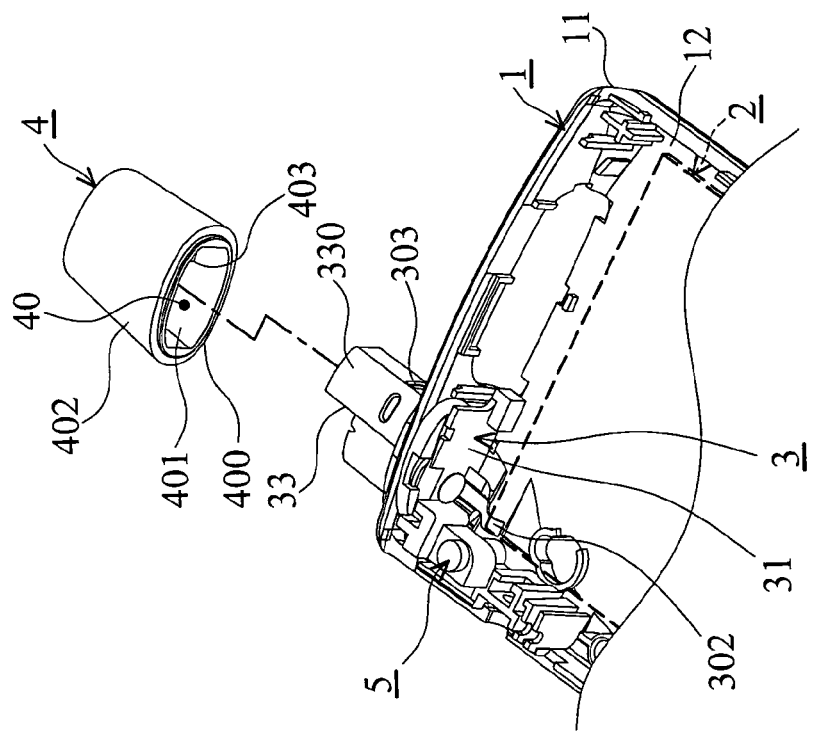
FIG. 4B is a partial exploded perspective view of the communication device (E) of FIG. 3, wherein the cap (4) is separated from an antenna unit (3)
Figure 4A:
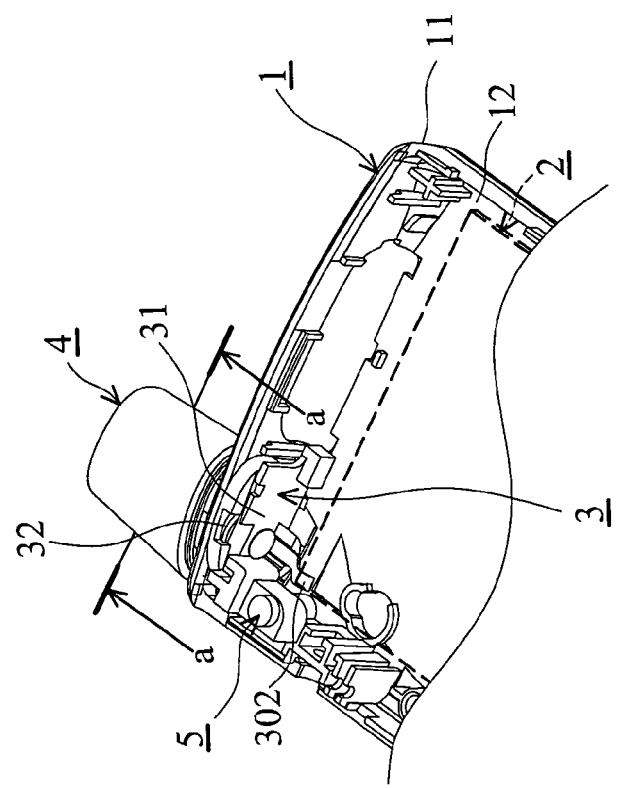
FIG. 4A is a partial perspective view of the communication device (E) according to line (i-i) in FIG. 3, showing the inner configuration of the communication device (E)
Figure 4C:
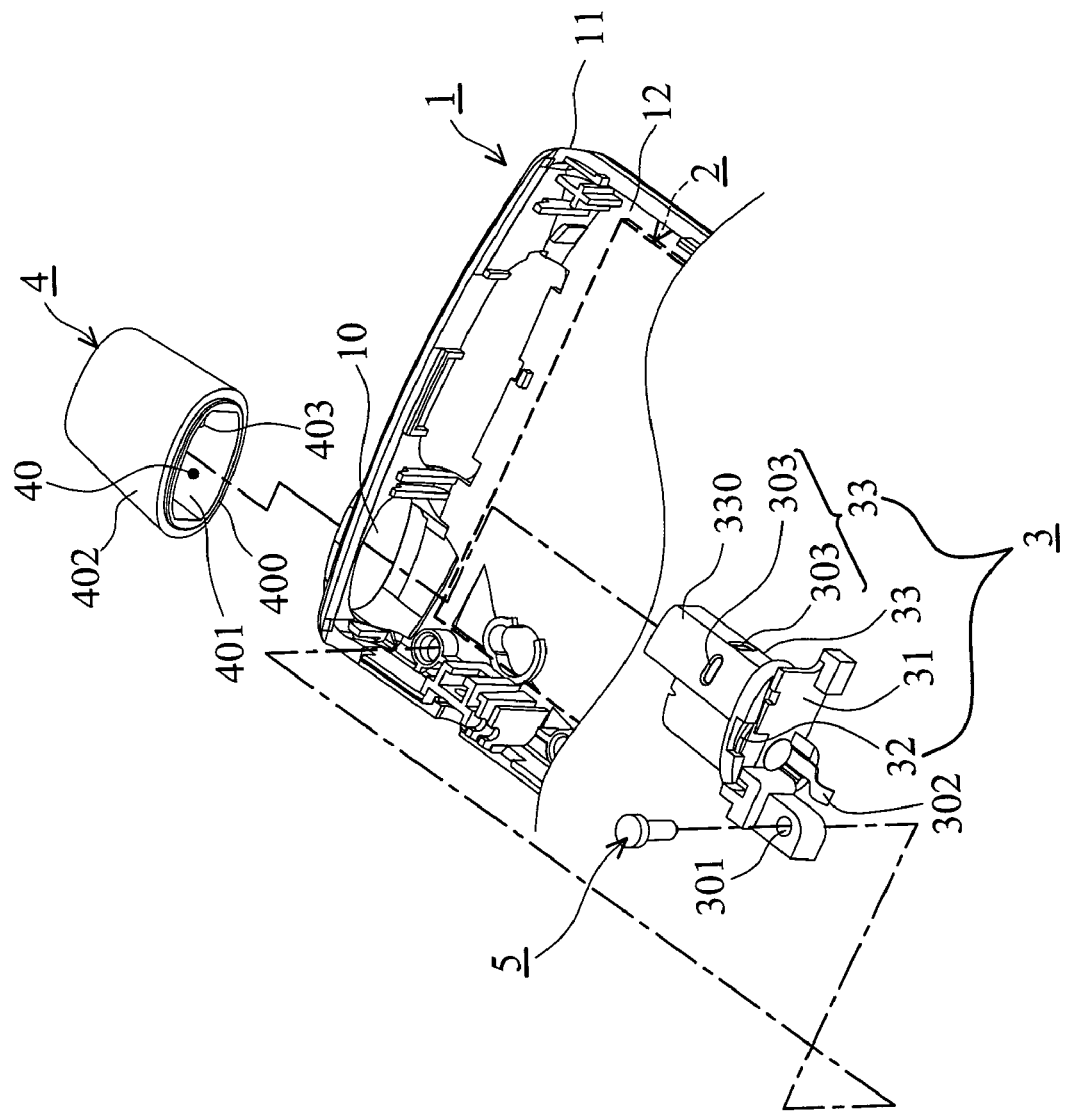
FIG. 4C is a partial exploded perspective view of the communication device (E) of FIG. 3, wherein the antenna unit (3) and the cap (4) are separated from the body (1)
Figure 5:
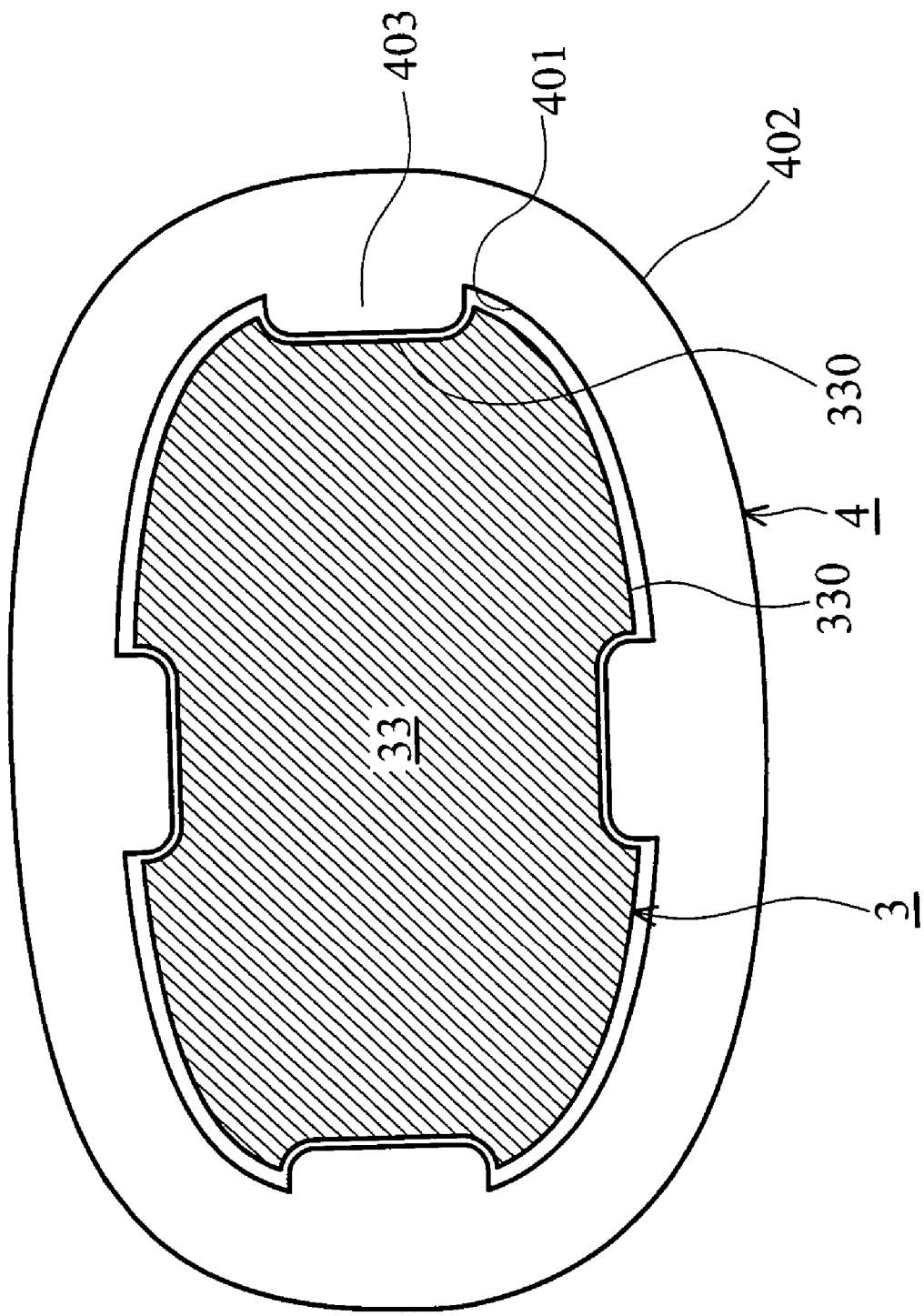
FIG. 5 is a cross-section according to line (a-a) in FIG. 4A.

FIGS. 4A, 4B and 4C are three partial perspective views of the communication device E according to line i-i of FIG. 3, showing the inner configuration thereof, respectively. The cap 4 in FIG. 4B is separated from the antenna unit 3, and the antenna unit 3 and the cap 4 in FIG. 4C are separated from the body 1. FIG. 5 is a cross-section of the antenna unit 3 connected with the cap 4 according to line a-a in FIG. 4A.

Referring to FIG. 4C, the body 1 comprises a passage 10, an body outer surface 11, an inner surface 12 and a threaded opening 13 formed on the inner surface 12. The passage 10 is an opening penetrating through the body outer surface 11 and the inner surface 12. The circuit board 2 is disposed on the inner surface 12 of the body 1.

The antenna unit 3 comprises a base 31, a coil module 32, an extended portion 33, a connecting portion 301 and a reed 302. The base 31 is a main substrate for the antenna unit 3, and the connecting portion 301 is a though hole formed on the base 31. The coil module 32 comprising metal for transmitting signals is disposed on the base 31. The extended portion 33 is a hollow rectangular element disposed on the base 31 for receiving the coil module 32 therein. Two first positioning portions 303 are recesses formed on the antenna outer surface 330 of the extended portion 33. The reed 302 disposed on the base 31 is electrically connected to the coil module 32.

The cap 4 is a rounded, hollow element, comprising an opening 400, an inner surface 401, an outer surface 402 and two pairs of second positioning portions 403. The opening 400 and the inner surface 401 constitute a receiving portion 40 indented on one end of the cap 4, and the second positioning portions 403 are protrusions formed on the inner surface 401 corresponding to the first positioning portions 303 formed on the extended portion 33 of the antenna unit 3.

As the antenna unit 3 is installed on the body 1, the extended portion 33 of the antenna unit 3 passes through the passage 10 of the body 1, i.e., the extended portion 33 of the antenna unit 3 is received in the passage 10 of the body 1 as shown in FIG. 4B, and the connecting portion 301 of the antenna unit 3 is aligned to the threaded opening 13 of the body 1. The connecting portion 301 of the antenna unit 3 is connected to the body 1 by fastening a screw 5 therebetween. Meanwhile, the reed 302 disposed on the base 31 overlaps the circuit board 2, electrically connecting the coil module 32 to the circuit board 2. The cap 4 is then separably disposed on the extended portion 33 of the antenna unit 3 protruding from the body outer surface 11 of the body 1.

In FIGS. 4A and 4C, as the second positioning portions 403 of the cap 4 engage the first positioning portions 303 of the extended portion 33 of the antenna unit 3, the cap 4 is temporarily disposed on the antenna unit 3.

It is noted that the first positioning portions 303 of the extended portion 33 can be the protrusions, and the second positioning portions 403 of the cap 4 can be the recesses, correspondingly.

Based on the features of the invention, other caps with different colors or types can be easily replaced from the exterior of the communication device E.

While the invention has been described in connection with what is presently considered to be the most practical and preferred embodiment, it is to be understood that the invention is not limited to the disclosed embodiments, but, on the contrary, is intended to accommodate various modifications and equivalent arrangements included within the spirit and scope of the appended claims.

What is claimed is:

1. A communication device, comprising:
   a body;
   a fixed antenna unit disposed on the body, comprising an antenna outer surface;
   a plurality of separated first positioning portions disposed on the antenna outer surface of the fixed antenna unit;
   a cap separably disposed on the fixed antenna unit, having an inner surface; and
   a plurality of second positioning portions disposed on the inner surface of the cap and corresponding to the first positioning portions disposed on the antenna outer surface of the antenna unit, jointed with the first positioning portions disposed on the fixed antenna unit to form a connection of the cap and the fixed antenna unit, wherein the jointed first and second positioning portions are unexposed and the fixed antenna unit is fully covered by the cap as well as the inner surface of the cap and the antenna outer surface of the antenna unit are not contacted to each other when the cap is disposed on the fixed antenna unit.

2. The communication device as claimed in claim 1, wherein the fixed antenna unit further comprises a connecting portion connected to the body.

3. The communication device as claimed in claim 2, further comprising a screw for securing the connecting portion of the fixed antenna unit to the body.

4. The communication device as claimed in claim 1, further comprising a screw for fastening the fixed antenna unit to the body.

5. The communication device as claimed in claim 1, wherein the communication device comprises a mobile phone.

6. The communication device as claimed in claim 1, wherein the first positioning portions are recesses formed on the antenna outer surface of the fixed antenna unit.

7. A communication device, comprising:
   a body;
   a circuit board disposed on the body;
   a fixed antenna unit electrically connected to the circuit board, comprising an outer surface and a plurality of separated first positioning portions disposed on the outer surface and a reed electrically connected to the circuit board; and
   a cap separably disposed on the fixed antenna unit, comprising a plurality of second positioning portions jointed with the first positioning portions of the fixed antenna unit, wherein the jointed first and second positioning portions are unexposed and the fixed antenna unit is fully covered by the cap when the cap is disposed on the fixed antenna unit.

8. The communication device as claimed in claim 7, wherein the fixed antenna unit further comprises a connecting portion connected to the body.

9. The communication device as claimed in claim 8, further comprising a screw for securing the connecting portion of the fixed antenna unit to the body.

10. The communication device as claimed in claim 7, further comprising a screw for fastening the fixed antenna unit to the body.

11. The communication device as claimed in claim 7, wherein the communication device comprises a mobile phone.

12. The communication device as claimed in claim 7, wherein the first positioning portions are recesses formed on the outer surface of the fixed antenna unit.

13. A communication device, comprising:
    a body having a body outer surface;
    a circuit board disposed on the body;
    a fixed antenna unit electrically connected to the circuit board and extending from the body outer surface of the body, comprising an antenna outer surface;
    a plurality of separated first positioning portions disposed on the antenna outer surface of the fixed antenna unit;
    a cap separably disposed on the fixed antenna unit, comprising an inner surface; and
    a plurality of second positioning portions disposed on the inner surface of the cap, jointed with the first positioning portions disposed on the antenna outer surface of the fixed antenna unit to form a connection of the cap and the fixed antenna unit, wherein the jointed first and second positioning portions are unexposed and the fixed antenna unit is fully covered by the cap with respect to the outer surface of the body as well as the inner surface of the cap and the antenna outer surface of the antenna unit are not contacted to each other when the cap is disposed on the fixed antenna unit.

14. The communication device as claimed in claim 13, wherein the cap is freely separated from the fixed antenna unit without changing the connection between the body, the circuit board and the fixed antenna unit.

15. The communication device as claimed in claim 13, wherein the cap disposed on the fixed antenna unit is located above the outer surface of the body.

16. The communication device as claimed in claim 13, wherein the fixed antenna unit is inextensible with respect to the body.

17. The communication device as claimed in claim 13, wherein the cap disposed on the fixed antenna unit has no connection with the body.

18. A communication device, comprising:
    a body;
    a circuit board disposed on the body;
    a fixed antenna unit electrically connected to the circuit board, comprising an antenna outer surface and a reed electrically connected to the circuit board;
    a plurality of separated first positioning portions disposed on the antenna outer surface of the fixed antenna unit;
    a cap separably disposed on the fixed antenna unit, comprising an inner surface; and
    a plurality of second positioning portions disposed on the inner surface of the cap and corresponding to the first positioning portions disposed on the antenna outer surface of the antenna unit, jointed with the first positioning portions disposed on the antenna outer surface of the fixed antenna unit to form a connection of the cap to the fixed antenna unit, wherein the jointed first and second positioning portions are unexposed and the fixed antenna unit is fully covered by the cap as well as the inner surface of the cap and the antenna outer surface of the antenna unit are not contacted to each other when the cap is disposed on the fixed antenna unit.

19. The communication device as claimed in claim 18, wherein the first positioning portions are recesses formed on the antenna outer surface of the fixed antenna unit.

20. The communication device as claimed in claim 18, wherein the second positioning portions are protrusions formed on the inner surface of the cap.

* * * * *